US006294103B1

(12) United States Patent
Coppens

(10) Patent No.: US 6,294,103 B1
(45) Date of Patent: Sep. 25, 2001

(54) USE OF AMPHIPHILIC COPOLYMERS CONTAINING A FLUORINATED MONOMER TO IMPART WATERPROOFNESS TO LEATHER

(75) Inventor: Dirk M. Coppens, Melsele (BE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/297,814

(22) PCT Filed: Oct. 15, 1997

(86) PCT No.: PCT/US97/18386

§ 371 Date: May 4, 1999

§ 102(e) Date: May 4, 1999

(87) PCT Pub. No.: WO98/20170

PCT Pub. Date: May 14, 1998

(30) Foreign Application Priority Data

Nov. 7, 1996 (EP) ................................................ 96117814

(51) Int. Cl.[7] ............................. C14C 9/00; C08L 33/16; C09D 133/16

(52) U.S. Cl. ........................... 252/8.57; 106/2; 8/94.1 R; 8/94.21; 427/389; 428/473; 525/199; 525/200

(58) Field of Search .......................... 252/8.57; 8/94.1 R, 8/94.21; 427/389; 525/199, 200; 106/2; 428/473

(56) References Cited

U.S. PATENT DOCUMENTS

| | | | |
|---|---|---|---|
| 2,803,615 | 8/1957 | Ahlbrecht et al. | 524/805 |
| 3,923,715 | 12/1975 | Dettre et al. | 524/199 |
| 4,525,305 | 6/1985 | Patel | 252/8.57 |
| 4,539,006 | 9/1985 | Langford | 8/94.1 R |
| 4,709,074 | 11/1987 | Bathelt et al. | 560/33 |
| 4,778,915 | 10/1988 | Lina et al. | 560/29 |
| 4,782,175 | 11/1988 | Wehowsky et al. | 560/26 |
| 4,873,306 | 10/1989 | Wehowsky et al. | 528/28 |
| 4,920,190 | 4/1990 | Lina et al. | 526/288 |
| 4,931,062 | 6/1990 | Bay et al. | 8/94.23 |
| 4,997,893 | 3/1991 | Suling et al. | 525/517.5 |
| 5,124,181 | 6/1992 | Schaffer et al. | 427/323 |
| 5,316,860 | 5/1994 | Stewart et al. | 8/94.1 R |
| 5,330,537 | 7/1994 | Stewart et al. | 8/94.1 R |
| 5,385,999 | 1/1995 | Anvers et al. | 528/21 |
| 5,534,604 | 7/1996 | Bildhauer et al. | 526/253 |
| 5,567,343 | 10/1996 | Ritter et al. | 252/8.57 |

FOREIGN PATENT DOCUMENTS

| | | |
|---|---|---|
| 90 65795 | 5/1991 | (AU) . |
| 42 40 274 A1 | 6/1994 | (DE) . |
| 298364 | 1/1989 | (EP) . |
| 324 354 A2 | 7/1989 | (EP) . |
| 324345 | 7/1989 | (EP) . |
| 372 746 | 6/1990 | (EP) . |
| 418661 | 3/1991 | (EP) . |
| 426530 A1 | 5/1991 | (EP) . |
| 526976 | 2/1993 | (EP) . |
| 579 267 A1 | 1/1994 | (EP) . |
| 682 044 | 11/1995 | (EP) . |
| WO 93/10085 | 5/1993 | (WO) . |
| WO 94/01587 | 1/1994 | (WO) . |
| WO 94/12561 | 6/1994 | (WO) . |

*Primary Examiner*—Anthony Green
(74) *Attorney, Agent, or Firm*—Robert H. Jordan; Eloise J. Maki

(57) ABSTRACT

The present invention provides an amphiphilic copolymer comprising recurring units (I) and (II), wherein: $R_f$ represents a fluorinated alkyl group having at least 3 carbon atoms; Q and Q' each independently represents an organic liking group or a chemical linkage; $R^1$ and $R^2$ each independently represents hydrogen or a $C_1$ to $C_4$ alkyl group; and $R_h$ represents a hydrocarbon group having at least 8 carbon atoms and optionally containing 1 to 3 substituents; and a recurring unit comprising at least one carboxylic acid group or salt thereof. The present invention also provides a method for making the above amphiphilic copolymer. The amphiphilic copolymer can be used in a leather treatment to provide waterproofness to the leather.

(I)

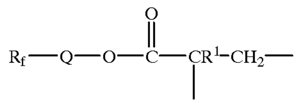

(II)

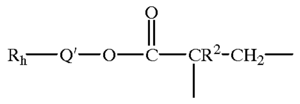

29 Claims, No Drawings

USE OF AMPHIPHILIC COPOLYMERS CONTAINING A FLUORINATED MONOMER TO IMPART WATERPROOFNESS TO LEATHER

FIELD OF THE INVENTION

This invention relates to leather manufacture and the use of fluoroalkyl group containing amphiphilic copolymers therein. More in particular, the invention relates to fluoroalkyl group containing amphiphilic copolymers and their use in a waterproofness imparting composition for leather substrates. In another aspect, the invention relates to a method for imparting a high degree of waterproofness to leather substrates and to the resulting treated leather substrates.

BACKGROUND OF THE INVENTION

The treatment of hides and skins to form leather involves a number of interdependent chemical and mechanical operations. These operations may be divided into a sequence of "wet end" steps followed by a sequence of"dry" steps. A description of each of these operations is provided in Fundamentals of Leather Manufacturing, Prof Dr. Heidemann (Eduard Roether KG, 1993). The primary tanning operation involves the treatment of the hide to preserve it and form useful leather. Chrome tanning salts are well known and widely used for this purpose. Chrome-tanned hides or skins are known in the art as 'wet blue leather'. In order to produce a uniform piece of leather with the required physical and aesthetic properties, a second tanning step, known as 'retanning', is employed. Retanning can be accomplished using a variety of naturally derived materials including extracts from vegetables or plants, and synthetic tanning agents known as "syntans", or combinations thereof After or during retanning, the leather can be colored and fatliquored. The present invention relates to the wet end operations which take place after primary tanning, namely retanning and fatliquoring.

A number of publications have proposed various copolymers for treating leather during tanning and retanning, addressing the problem of making treated leather more water resistant or completely waterproof EP-A-372 746 discloses a method and process for treating leather utilizing selected amphiphilic copolymers for improving the strength, temper and water resistance of the leather. The amphiphilic copolymers are formed from a predominant amount of at least one hydrophobic monomer and a minor amount of at least one copolymerizable hydrophilic monomer. The application states that the process may be particularly useful as a one step substitute for conventional retanning and fatliquoring treatment steps.

EP-A-682 044 discloses copolymers comprising ethylenically unsaturated dicarboxylic acid anhydrides, long chain olefins and fluorolefins. Leathers treated with these polymers are shown to yield good waterproofness results according to the Bally-Penetrometer test.

U.S. Pat. No. 5,124,181 discloses copolymers which contain (a) from 50 to 90% by weight of $C_8$ to $C_{40}$ alkyl methacrylates, vinyl esters of $C_8$ to $C_{40}$ carboxylic acids or mixtures thereof and (b) from 10 to 50% by weight of monoethylenically unsaturated $C_3$ to $C_{12}$ carboxylic acids, monoethylenically unsaturated dicarboxylic anhydrides, monoesters or monoamides of monoethylenically unsaturated $C_4$ to C12 dicarboxylic acids, amides of $C_3$ to $C_{12}$ monocarboxylic acids or mixtures thereof as copolymerized units and which have molecular weights of from 500 to 30,000. The copolymers are used in at least partially neutralized form in aqueous solution or dispersion for making leather and furs water repellent.

WO 94/01587 discloses water-dispersible and/or water-emulsifiable co-oligomers containing (a) fatty crotonates; (b) radically copolymerizable, hydrophilic, ethylenically unsaturated acids and/or their anhydrides; and possibly (c) minor amounts of other copolymerizable comonomers. These co-oligomers are used as amphiphilic agents for greasing leather and pelts.

Despite the various publications, employing different combinations of hydrophilic and hydrophobic monomers to obtain waterproofing properties of leather, there is still a need for further improvement particular under demanding conditions.

SUMMARY OF THE INVENTION

In accordance with the present invention, there is provided a method of treating leather comprising contacting a leather, in particular a tanned leather, with an amphiphilic copolymer, said amphiphilic copolymer comprising the following recurring units:

(I)

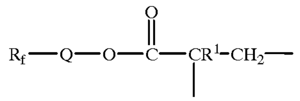

(II)

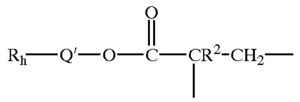

wherein:

- $R_f$ represents a fluorinated alkyl group having at least 3 carbon atoms;
- Q and Q' each independently represent an organic linking group or other chemical linkage;
- $R^1$ and $R^2$ each independently represent hydrogen or a $C_1$–$C_4$ alkyl group; and
- $R_h$ represents a hydrocarbon group having at least 8 carbon atoms and optionally containing I to 3 substituents;
- and a recurring unit comprising at least one carboxylic acid group or salt thereof.

The present invention further provides amphiphilic copolymers as defined above and aqueous compositions comprising them.

Additionally, the present invention provides a use of an above defined amphiphilic copolymer in treating leather to provide waterproofness thereto.

Also the present invention provides leathers comprising an amphiphilic copolymer as defined above.

Finally, the present invention provides a method for making above defined amphiphilic copolymers.

The invention simplifies the manufacture of waterproof leather by providing in one step the desired properties normally obtained by separate, conventional wet end retanning and fatliquoring steps.

DETAILED DESCRIPTION OF THE INVENTION

A particularly preferred amphiphilic copolymer for use in connection with this invention is a copolymer wherein the recurring unit having at least one carboxylic acid group or salt thereof corresponds to the following formula (III):

(III)

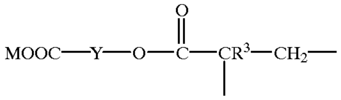

wherein;

$R^3$ represents hydrogen or a $C_1$ to $C_4$ alkyl group;

Y represents an organic linking group or other chemical linkage and;

M represents a hydrogen or a cation.

A fluorinated alkyl group $R_f$ in the fluorochemical containing recurring unit according to formula (1), is preferably a fluorinated, stable, inert, preferably saturated, non-polar, monovalent alkyl group. It can be straight chain, branched chain, or cyclic or combinations thereof It can contain heteroatoms, bonded only to carbon atoms, such as oxygen, divalent or hexavalent sulfur, or nitrogen. $R_f$ is preferably a fully-fluorinated alkyl group, but hydrogen or chlorine atoms can be present as substituents but preferably not more than one atom of either is present for every two carbon atoms. The $R_f$ group has at least 3 carbon atoms, preferably 3 to 14 carbon atoms, and more preferably at least 6 carbon atoms. $R_f$ preferably contains about 40% to about 80% fluorine by weight, more preferably about 50% to about 78% fluorine by weight. The terminal portion of the $R_f$ radical is preferably a perfluorinated moiety, preferably containing at least 7 fluorine atoms, e.g., $CF_3CF_2CF_2$-, $(CF_3)_2CF$-, $F_5CF_2$-. Preferred $R_f$ groups are fully or substantially fluorinated and are preferably those perfluorinated alkyls according to the formula $C_nF_{2n+1}$- where n is 3 to 14.

Linking groups Q, Q' and Y in the above formulas (I) to (III) preferably contain from 1 to about 20 carbon atoms. They can optionally contain oxygen, nitrogen, or sulfur-containing groups or a combination thereof, and are preferably free of functional groups that substantially interfere with free-radical polymerization (e.g., polymerizable olefinic double bonds, thiols, easily abstracted hydrogen atoms such as cumyl hydrogens, and other such functionality known to those skilled in the art). Examples of suitable linking groups include straight chain, branched chain or cyclic alkylene, arylene, aralkylene, oxy, oxo, hydroxy, thio, sulfonyl, sulfoxy, amino, imino, sulfonamido, carboxyamido, carbonyloxy, urethanylene, ureylene, and combinations thereof such as sulfonamidoalkylene. Preferred linking groups for Q and Q' include $-(CH_2CH_2)_kO$- and $-SO_2N(R)CH_2CH_2$- wherein k is 1 or 2 and R is a $C_1$ to $C_4$-alkyl group. A preferred linking group Y is an aliphatic or aromatic linking group.

$R_h$ groups for use in connection with the present invention are hydrocarbon groups having at least 8 carbons and more preferably at least 12 carbon atoms. These hydrocarbon groups can contain 1 to 3 substituents such as e.g., a halogen, an amino group, an aryl group, an alkoxy group, etc. More preferably, however, the hydrocarbon group is unsubstituted and preferably saturated. Particularly preferred $R_h$-groups for use in this invention are unsubstituted linear or branched alkyl groups preferably having at least 12 carbon atoms. Hydrocarbon groups $R_h$ for use in this invention may also contain cyclo aliphatic groups such as, e.g., a cyclohexane.

Suitable cations M for use in the present invention include monovalent ions such as e.g. sodium ion, potassium ion or ammonium ion. It is also possible to use a mixture of two or more of such cations.

The amphiphilic copolymers used in connection with the present invention can be prepared by free radical polymerisation, e.g., by solution- or emulsion-polymerization techniques of monomers (a), (b) and an ethylenically unsaturated monomer having a carboxylic acid group, a salt of a carboxylic acid group or a precursor of a carboxylic acid group using a free radical initiator:

(a)

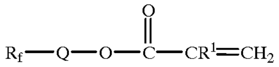

(b)

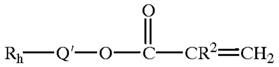

Preferably, the ethylenically unsaturated monomer corresponds to the following formula (C):

(c)

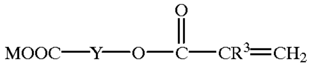

In the above formulas (a), (b) and (c) $R_f$, $R_h$, $R^{1,2,3}$, Q, Q', Y and M have the same meaning as defined above. Useful free radical initiators are known in the art and include azo compounds, such as azoisobutyronitrile and azo-2-cyanovaleric acid, hydroperoxides such as cumene, t-butyl and t-amyl hydroperoxide, dialkyl peroxides such as di-t-butyl and dicumylperoxide, peroxyesters such as t-butylperbenzoate and di-t-butylperoxy phthalate, diacylperoxides such as benzoyl peroxide and lauroyl peroxide. Conventional chain transfer agents can be used in order to control the molecular weight of the polymer. Examples include mercaptoethanol, mercaptoacetic acid, stearylmercaptane, tert-dodecylmercaptane and the like.

In case the ethylenically unsaturated monomer comprises a precursor of a carboxylic acid group such as e.g. an anhydride, the precursor can be converted to a carboxylic acid group or salt thereof during or subsequent to the free radical polymerisation.

Fluorochemical monomers and in particular (meth) acrylate monomers corresponding to formula (a) and methods for the preparation thereof are known and disclosed, e.g., in U.S. Pat. No. 2,803,615. Examples of such compounds include general classes of fluorochemical acrylates or methacrylates containing fluorinated sulfonamido groups, acrylates or methacrylates derived from telomer alcohols, acrylates or methacrylates derived from fluorochemical carboxylic acids and acrylates or methacrylates as disclosed in EP 526976. Preferred examples of fluorochemical (meth) acrylates include:

$CF_3(CF_2)_4CH_2OCOC(CH_3){=}CH_2$ $CF_3(CF_2)_6(CH_2)_2OCOC(CH_3){=}CH_2$ $CF_3(CF_2)_6(CH_2)_2OCOCH{=}CH_2$ $CF_3(CF_2)_6CH_2OCOC(CH_3){=}CH_2$ $CF_3(CF_2)_6CH_2OCOCH{=}CH_2$ $CF_3(CF_2)_7(CH_2)_2OCOCH{=}CH_2$

-continued $R_a$ $CF_3(CF_2)_7SO_2N(CH_2)_2OCOCH{=}CH_2$ $CF_3CF_2(CF_2CF_2)_{2\text{-}8}CH_2CH_2OCOCH{=}CH_2$ $R_a$ $CF_3(CF_2)_7SO_2N(CH_2)_2OCOC(CH_3){=}CH_2$ $CF_3(CF_2)_7CH_2CH_2SO_2NCH_2CH_2OCOC(CH_3){=}CH_2$ $CH_3$ $R_a$ = methyl or ethyl.

Suitable monomers according to formula (b) for preparing amphiphilic copolymers in accordance with this invention include long chain $C_8$ to $C_{40}$ alkyl acrylates and $C_8$ to $C_{40}$ alkyl methacrylates. Examples of suitable compounds of this type are 2-ethylhexyl (meth)acrylate, n-decyl (meth) acrylate, dodecyl (meth)acrylate, isotridecyl (meth)acrylate, tetradecyl (meth)acrylate, $C_{16/18}$ tallow fatty alcohol (meth) acrylate, octadecyl (meth)acrylate, palrityl (meth)acrylate, n-eicosyl (meth)acrylate. Also suitable are mixtures of long chain alkyl(meth)acrylates. Preferably used are acrylic and methacrylic esters derived from alcohols of 12 to 28 carbon atoms.

Suitable ethylenically unsaturated monomers having a carboxylic acid group, a salt of a carboxylic acid group or a precursor of a carboxylic acid group for preparing amphiphilic copolymers in accordance with this invention include dicarboxylic acid anhydrides, such as, e.g., maleic acid anhydride, or monoethylenically unsaturated $C_3$ to $C_{12}$ carboxylic acids. Examples include acrylic acid, methacrylic acid, 2-carboxyethylacrylate, monomethacryloyloxyethyl phthalate.

In order to modify the properties of the treated leather, optionally also other monomers and/or oligomers can be added. For example, short chain alkyl(meth)acrylates such as butyl(meth)acrylate can be incorporated. In order to increase the softness of the leather, monomers and/or oligomers comprising siloxane a: groups can be added. Preferably however, at least 60% by weight and more preferably at least 70% by weight of an amphiphilic copolymer in connection with this invention consists of recurring units according to formulas (I) and (II) and recurring units having a carboxylic acid group or salt thereof The final leather properties can be selected as desired by balancing contents of carboxylic acid (or salt), the fluorine content and the long chain alkyl group content. Increasing the free acid (and salt) content will increase water solubility of an amphiphilic copolymer in connection with this invention and therefore also the hydrophilicity thereof. On the other hand, if the carboxylic acid content is low the copolymer may not adequately penetrate the leather structure and/or may not bind sufficiently into the leather. In accordance with the present invention it is highly preferred to incorporate sufficient free carboxylic acid (or salt) groups in the polymer in order to provide the polymer with sufficient crosslinking possibilities with the tanned leather, so as to irreversibly bond the polymer to the leather. A particularly preferred amount of recurring units having at least one carboxylic acid group or salt thereof, in particular recurring units according to formula (In), is between 5% and 6% by weight and more preferably between 10% and 50% by weight based on the total weight of the recurring units according to formulas (I) and (II) and the recurring units having at least one carboxylic acid group or salt thereof.

The long chain alkyl group content is preferably high enough to assure the leather is lubricated properly. On the other hand the long chain alkyl group content is preferably such that there is still a desired level of penetration into the leather. Preferably, the amount of recurring units according to formula (II) is at least 20% by weight of the total weight of the recurring units according to formulas (I) and (II) and the recurring units having at least one carboxylic acid group or salt thereof In particular fatty alkyl groups having an average chain length of at least 12 carbon atoms are preferably present in an amount of above 20% by weight.

The content of recurring units according to formula (I) is preferably at least 1% by weight, more preferably at least 5% by weight and most preferably at least 10 % by weight based on the total weight of the recurring units according to formulas (I) and (II) and the recurring units having at least one carboxylic acid group or salt thereof If the fluorine content is too low, the water repellency of the leather may be insufficient. On the other hand, if the fluorine content is too high, the leather may become undesirable hard.

An amphiphilic copolymer in connection with the present invention is preferably used as an aqueous composition, in particular an aqueous dispersion in water. If the copolymer is made by solution polymerization, it can be dispersed in water, through vigorously mixing the solution polymer with water. A solvent free dispersion can be obtained by subsequent distillation of the polymerization solvent. A partial or complete neutralization of the acid groups present in the copolymer can be obtained by means of a suitable base, such as e.g. sodium hydroxide, potassium hydroxide, ammonium hydroxide or triethanolamine and the like.

In accordance with a preferred method of treating leather in connection with this invention, a leather such as a tanned hide is contacted with an aqueous composition, preferably an aqueous dispersion, comprising amphiphilic copolymer. Amphiphilic copolymer aqueous dispersions in accordance with the invention are suitable for the treatment of all conventional tanned hides, in particular hides tanned with mineral tanning agents, such as chromium(III)salts. The tanned hides are usually neutralized before treatment. They may be dyed before treatment. However, dyeing may also be carried out after a waterproofing treatment in accordance with this invention.

The tanned hides can be treated with an aqueous dispersion comprising an amphiphilic copolymer in accordance with the invention preferably in an aqueous liquor obtained by diluting the amphiphilic copolymer dispersions with water, at a pH of from 3 to 10, preferably from 5 to 8, and at from 20° C. to 70° C., preferably from 40° C. to 60° C. The amount of the amphiphilic copolymer dispersion applied to the leather in accordance with this invention is chosen so that sufficiently high or desirable water repellency is imparted to the substrate, said amount usually being between 0.1% and 30% by weight, preferably between 0.5% and 15% by weight, based on the shaved weight of the leather or the wet weight of the hide or wet blue leather. The amount which is sufficient to impart desired repellency can be determined empirically and can be increased as necessary or desired. The treatment is effected, for example, by drumming. After the treatment with the aqueous dispersion described above, the pH of the treatment liquor is preferably brought to 3–5, preferably 3.34, by addition of an acid in particular an organic acid, such as formic acid.

In order to increase repellency properties and the durability thereof and to aid in the application of an aqueous composition according to the present invention to a leather substrate to be treated therewith, it may be advantageous to incorporate into an aqueous composition according to this invention, one or more other substances such as oil and/or water repellent compositions and/or siloxane softening agents. Also other additives such as conventional leather finishing agents, e.g., retanning, fatliquoring agents can be added.

Particularly preferred aqueous compositions for use in connection with the present invention include a water and/or oil repellent composition in addition to the amphiphilic copolymer in connection with the present invention. Preferred water and/or oil repellent compositions for use in this invention are fluorochemical compositions comprising a mixture of normally solid compounds and/or polymers, each of the compounds having at least two fluoroaliphatic groups and a large hydrocarbon moiety and each of the polymers having at least one fluoroaliphatic group and a plurality of said hydrocarbon moiety. Particularly preferred are compositions comprising compounds that are fluoroaliphatic esters of dimer acids and/or trimer acids. Examples of fluorochemical compositions that can be used in an aqueous composition in accordance with this invention are described in WO 93/10085.

Further suitable water and/or oil repellent composition that can be used in connection with this invention comprise polysiloxanes having fluoroaliphatic- and carboxyl-containing terminal groups as disclosed in WO 94/12561, fluoro- and polysiloxane-containing urethanes as disclosed in EP 298364, carboxyl group containing polysiloxanes as disclosed in EP 324345. Still further water and/or oil repellent compositions are disclosed in U.S. Pat. Nos. 4,525,305, 4,920,190, 4,782,175, 4,778,915, 4,539,006, 3,923,715 and 4,709,074.

The invention is illustrated with reference to the following examples without however the intention to limit the invention thereto.

EXAMPLES

Formulation and treatment procedure

A typical procedure followed for the treatment of wet blue leather with the fluorochemical compositions of the present invention is outlined in the table below:

| Step | Treatment Solution | Temperature | Time |
|---|---|---|---|
| 1. Rewetting (2x) | 500% water | 30° C. | 60 min |
| 2. Neutralization | 150% water + | 30° C. | overnight |
| | 1.5% Tanigan Pak N + | | during |
| | 2% Sodiumformiate + | | 5 min/ |
| | 0.5% Sodiumbicarbonate | | hour |
| 3. Wash (3x) | 300% Water | 50° C. | 5 min |
| 4. Retanning/ | 100% water + | 60° C. | |
| Fatliquoring | 4% Chesnut + | | 40 min |
| | 4% amphiphilic | | 90 min |
| | fluorochemical copolymer | | 30 min |
| | Formic Acid to pH 3.5 | | |
| 5. Wash | 300% Water | 50° C. | 5 min |
| 6. Fixation | 200% Water + | 40° C. | 60 min |
| | 4% Baychrom F | | |
| 7. Wash | 200% Water | 40° C. | 10 min |

The so treated leather sample was horsed-up overnight, dried at 60° C. during 60 min, staked in the conventional manner and conditioned at room temperature during 2 weeks.

The leather substrates used for the evaluation of the treatment according to the invention are all commercially available and are listed below:

Wet blue leather, 2.0–2.2 mm, tanned according to typical procedures used to prepare shoe upper leather and available from Rompa Leder, the Netherlands Wet blue leather, 1.7 mm, available from Rompa Leder, the Netherlands Bovine nubuck for shoe upper leather (crust leather), 1.4 mm.

Respective data of water and oil repellency shown in the Examples and Comparative Examples are based on the following methods of measurement and evaluation criteria:

Dynamic Saline Water Resistant Test (Maeser Flexes)

The water resistance of the leathers was tested according to ASTM D-2009-70, using a Maeser water penetration tester. The number of Maeser flexes needed to cause water to penetrate the leather is recorded. Since this test utilizes saline water, it is useful for predicting the resistance of leather to damage not only from water, but also from perspiration. A Maeser flex value of greater than 15.000 is the minimum criterion established by the U.S. Military for waterproof boot leather.

Water Repellency Test (WR)

The water repellency (WR) of a treated substrate was measured using a series of water-isopropyl alcohol test liquids and was expressed in terms of the "WR" rating of the treated substrate. The WR rating corresponds to the most penetrating test liquid which does not penetrate or wet the substrate surface after 15 seconds exposure. Treated substrates which are penetrated by or are resistant only to a 100% water (0% isopropyl alcohol) test liquid, the least penetrating test liquid, are given a rating of 0, whereas treated substrates resistant to a 100% isopropyl alcohol (0% water) test liquid, the most penetrating test liquid, are given a rating of 10. Other intermediate ratings are calculated by dividing the percent isopropylalcohol in the test liquid by 10, e.g., a treated substrate resistant to a 70%/30% isopropyl alcohol/water blend, but not to a 80%/20% blend, would be given a rating of 7.

Spray Rating (SR)

The spray rating of a treated substrate is a value indicative of the dynamic repellency of the treated substrate to water that impinges on the treated substrate. The repellency is measured by Standard Test Number 22, published in the 1985 Technical Manual and Yearbook of the American Association of Textile Chemists and Colorists (AATCC), and is expressed in terms of 'spray rating' of the tested substrate. The spray rating is obtained by spraying 250 ml water on the substrate from a distance of 15 cm. The wetting pattern is visually rated using a 0 to 100 scale, where 0 means complete wetting and 100 means no wetting at all.

Oil Repellency (OR)

The oil repellency of a treated substrate is measured by the American Association of Textile Chemists and Colorists (AATCC) Standard Test Method No. 118-1983, which test is based on the resistance of a treated substrate to penetration by oils of varying surface tensions. Treated substrates resistant only to Nujol®, mineral oil (the least penetrating of the test oils) are given a rating of 1, whereas treated substrates resistant to heptane (the most penetrating of the test oils) are given a rating of 8. Other intermediate values are determined by use of other pure oils or mixtures of oils, as shown in the following Table.

Standard Test Liquids

| AATCC Oil Repellency Rating Number | Compositions |
|---|---|
| 1 | Nujol$^R$ |
| 2 | Nujol$^R$/n-Hexadecane 65/35 |
| 3 | n-Hexadecane |
| 4 | n-Tetradecane |
| 5 | n-Dodecane |
| 6 | n-Decane |
| 7 | n-Octane |
| 8 | n-Heptane |

Bally Penetrometer

For the testing of shoe upper leathers for water repellency, a Bally Penetrometer test was done according to DIN 53338. For this test, a Bally Penetrometer Model 5023 (a standardized dynamic testing machine for shoe upper leather) was used. The test piece was alternatively buckled and stretched by the machine, like an upper leather in actual use, while in contact with water on one side. The values measured in this test are:

1. the time until water first penetrates from one side of the test piece of treated leather to the other (said time is, for untreated leather, typically less than 15 minutes), and
2. the weight percent increase of the test piece caused by water absorption during the test (said weight increase, for untreated leather, is typically greater than 100% after one hour).

Abraded Oil and Water Repellency

The repellency of an abraded treated substrate is measured on 5 cm×12.5 cm test pieces of treated substrate which has been abraded using 10 back and forth rubs over a 5-second period with abrasive paper ("WET OR DRY - TRIMITE" No. 600C) in an AATCC crockmeter (Model CM-1). The above-described OR and WR repellency tests are performed on the abraded test pieces and the repellency ratings recorded as Abraded Oil Repellency (AOR) and Abraded Water Repellency (AWR) values.

Abbreviations

The following abbreviations and trade names are used in the examples:

MeFOSE(M)A: N-methyl perfluorooctyl sulfonamidoethyl(meth)acrylate

OD(M)A: octadecyl(meth)acrylate

AA: acrylic acid

EMP : monomethacryloyl oxyethyl phthalate

2-CEA: 2-carboxyethylacrylate

IBMA: isobutylmethacrylate

IPA: isopropyl alcohol

DPM: Dipropylene glycol monomethylether

TEA: triethanolamine

AIBN: azo-isobutyronitrile

NaOH: sodiumhydroxide

Lubritan™ WP: acrylic syntan, available from Rohm and Haas

FC: fluorochemical oil- and water- repellent leather protector based on fluoroaliphatic esters of dimer acids and/or trimer acids.

Si-Mac: polydimethylsiloxane macromer, available in different molecular weight, from Shin-Etsu All parts, ratios, percentages etc. in the following examples and the rest of the specification are by weight unless otherwise noted.

A. Synthesis of Amphiphilic fluorochemical Copolymers.

Several amphiphilic fluorochemical copolymers as given in Table I have been prepared according to the general procedure for the synthesis of MeFOSEA/ODA/AA 40/30/30.

In a 3 necked reaction flask were charged 18 parts AA, 18 parts ODA, 24 parts MeFOSEA, 60 parts IPA, 1.2 parts mercaptoacetic acid and 0.6 parts AIBN. The flask was purged with nitrogen and heated to 65° C. The reaction was run for 16 hours after which the mixture was cooled. From this mixture, 40 parts were poured into 140 parts warm deionized water while stirring. To this mixture were added 20% NaOH until the pH was about 7. A slightly hazy solution was formed with a solids content of about 12%/a. This solution can be added to the tanning drum without further modification. Following the same procedure several other amphiphilic fluorochemical copolymers were prepared.

Examples 1 to 6 and Comparative Examples C-1 and C-2

In Examples 1 to 6, several amphiphilic fluorochemical copolymers as given in Table 1, prepared according to the general procedure were tested on wet blue leather obtained from Rompa Leder (Netherlands). The leather had a thickness between 2.0–2.2 mm. The wet blue leather was tanned according to a general procedure to prepare shoe upper leather. The treatment agent of Comparative Example C-1 did not contain any fluorochemical monomer and the treatment agent of Comparative Example C-2, did not contain hydrocarbon monomer.

For the Examples and Comparative Examples the leather was treated according to the general procedure as described above. After the different treatment steps, the leather was horsed-up overnight and dried at 60° C. during 60 min. After softening and conditioning for 2 weeks at room temperature, the leather was tested according to the ASTM D-2009-70 test. The results of waterproofness are given in Table 1.

TABLE 1

Composition of Amphiphilic Fluorochemical Copolymers and Waterproofing Properties of Leather Treated Therewith

| Ex No | % ODA | % ODMA | % MeFOSEA | % MeFOSEMA | % AA | Maeser Flexes |
|---|---|---|---|---|---|---|
| 1 | 30 | — | 40 | — | 30 | >50.000 |
| 2 | — | 60 | — | 10 | 30 | 40.000 |
| 3 | — | 50 | — | 20 | 30 | 300.000 |
| 4 | — | 40 | — | 30 | 30 | 450.000 |
| 5 | — | 30 | — | 40 | 30 | 95.000 |
| 6 | — | 20 | — | 50 | 30 | 12.000 |
| C-1 | — | 70 | — | — | 30 | 16.000 |
| C-2 | — | — | — | 70 | 30 | 500 |

As can be seen from the results, the amphiphilic fluorochemical copolymers impart a high degree of waterproofness to leather treated therewith. The use of small amounts (10% by weight) of fluorochemical (meth)acrylate in the polymer increases the waterproofness dramatically. For high demanding conditions (Maeser Flex more than 15.000), the amount of long chain alkyl hydrocarbon monomer is preferably more than 20% by weight.

Example 7 and Comparative Example C-3

In Example 7 a polymer was prepared from MeFOSEMA/ODMA/AA (30/40/30) using mercaptoacetic acid, according to the general procedure outlined above. The polymer dispersion was applied to a new batch of wet blue leather (2.0–2.2 mm thickness). The performance of the treated leather was compared to the performance of the same wet blue leather treated with a commercial available acrylic syntan (Lubritan™ WP, available from Rohm and Haas). The application conditions were as described above. Of each treatment, six leather samples were evaluated. The six Comparative Examples C-3 treated with Lubritan™ WP showed a large variation in Maeser flex results (min 24.500–max 156.000); with an average value of 70.000. In contrast therewith, the six pieces of Example 7 reached more than 500.000 Maeser flexes.

The results indicate that superior performance is obtained when fluorochemical monomers are incorporated in the amphiphilic copolymer compared to pure hydrocarbon amphiphilic copolymers which are believed to be among the best state of the art waterproofing chemicals.

Examples 8 to 11

For Examples 8 to 11 different amphiphilic fluorochemical copolymers were prepared according to the general procedure. The copolymers were applied to wet blue leather (2.0–2.2 mm) at 4% by weight. The results of waterproofness (test in duplicate) are given in Table 2.

TABLE 2

| Waterproofness of Wet Blue Leather Treated with Amphiphilic Fluorochemical Copolymers | | | | | | | | |
|---|---|---|---|---|---|---|---|---|
| Ex No | MeFOSEMA % | ODMA % | LMA % | AA % | EMP % | B-CEA % | Maeser flexes | Maeser flexes |
| 8 | 30 | 40 | — | 30 | — | — | 430.000 | 500.000+ |
| 9 | 33 | — | 33 | 33 | — | — | 33.000 | 22.000 |
| 10 | 33 | 33 | — | — | 33 | — | 500.000+ | 500.000+ |
| 11 | 30 | 40 | — | — | — | 30 | 500.000+ | 500.000+ |

Note:
the polymer of Example 8 was made with stearylmercaptan as chain transfer agent instead of mercaptoacetic acid.

Example 12

In Example 12, an amphiphilic fluorochemical copolymer was prepared from MeFOSEMA/ODMA/IBMA/AA 20/40/10/30 according to the general procedure and neutralized with triethanolamine. Wet blue leather (1.7 mm) was treated with the amphiphilic fluorochemical copolymer dispersion at 4% by weight based on the shaved weight of the leather. The leather was tested for its waterproofness. The test was stopped after 140.000 Maeser flexes were obtained. This result indicates that also short chain alkyl acrylates can be incorporated in the amphiphilic fluorochemical copolymers without damaging the waterproofing properties of the leather treated therewith.

Examples 13 to 17

In Examples 13 to 17 amphiphilic fluorochemical copolymers were made from 23 parts MeFOSEA, 23 parts ODMA, 30 parts AA and 23 parts siloxane macromer. The polymers were made according to the general procedure, but using DPM as solvent. The polymers were dispersed using triethanolamine or sodiumhydroxide. The dispersions were applied to wet blue leather (1.7 mm) at 4% by weight based on the shaved weight of the leather. The results of water repellency (mean values of 3 measurements) are given in Table 3.

TABLE 3

| Waterproofness of Wet Blue Leather Treated with Amphiphilic Fluorochemical Copolymers | | | |
|---|---|---|---|
| Ex No | Mw of Si-Mac | Neutralisation | Maeser flexes |
| 13 | 2000 | TEA | 150.000+ |
| 14 | 2000 | NaOH | 85.000 |
| 15 | 5000 | TEA | 50.000+ |
| 16 | 5000 | NaOH | 100.000+ |
| 17 | 10.000 | NaOH | 100.000+ |

The results indicate that the addition of siloxane macromers having different molecular weight does not harm the waterproofing properties of the treated leather.

Example 18

In Example 18, an amphiphilic fluorochemical copolymer was made from 30 parts MeFOSEMA, 40 parts ODMA and 30 parts AA The polymer was neutralized with triethanolamine. A blend of 80 parts of the polymer dispersion and 20 parts of a conventional fluorochemical oil-and water repellent leather protector FC was applied to wet blue leather (1.7 mm) at 4% based on the shaved weight of the leather. The treated leather was tested for oil and water repellency. The results are given in Table 4.

TABLE 4

| Overall Repellency Properties or Wet Blue Leather Treated with Amphiphilic Fluorochemical Copolymers | | | | | | |
|---|---|---|---|---|---|---|
| Ex No | OR | AOR | SR | WR | AWR | Maeser flexes |
| 18 | 6 | 5 | 90 | 10 | 10 | 100.000+ |

Example 19 and Comparative Example C-4

The same kind of experiment was repeated in Example 19 and Comparative Example C-4 but with Bovine nubuck leather (for shoe upper leather). For this experiment a dispersion of amphiphilic fluorochemical copolymer ODMA/MeFOSEMA/AA 30/40/30, as prepared in Example 5, is used. In Example 19, the leather was treated with a mixture of 4% amphiphilic fluorochemical copolymer and 4% of a conventional fluorochemical oil- and water repellent leather protector FC. Comparative Example C-4 was made using 4% Lubritan™ WP in combination with 4% FC. The results of water and oil repellency are given in Table 5.

TABLE 5

| Overall Repellency Properties of Nubuck Leather Treated with Amphiphilic Fluorochemical Copolymers | | | | | | | | |
|---|---|---|---|---|---|---|---|---|
| Ex | | | | | | Bally Penetrometer | | Maeser |
| No | OR | WR | AOR | AWR | SR | time (min) | % abs | flexes |
| 19 | 5 | 8 | 3 | 6 | 80 | 240+ | 18 | 120.000 |
| C-4 | 4 | 8 | 0 | 3 | 80 | 240+ | 19 | 11.000 |

The results indicate that especially the waterproofness and the abraded water repellency of the leather treated with amphiphilic fluorochemical copolymers is superior.

What is claimed is:

1. Method of treating leather comprising contacting a leather with an amphiphilic copolymer, said amphiphilic copolymer comprising the following recurring units:

(I)

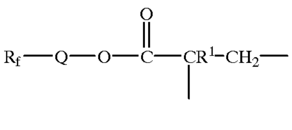

-continued (II)

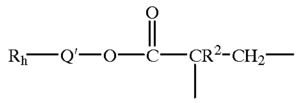

wherein:

$R_f$ represents a fluorinated alkyl group having at least 3 carbon atoms;

Q and Q' each independently represent an organic linking group or a bond;

$R^1$ and $R^2$ each independently represent hydrogen or a $C_1$ to $C_4$ alkyl group and;

$R_h$ represents a hydrocarbon group having at least 8 carbon atoms and optionally containing 1 to 3 substituents selected from the group consisting of a halogen, an amino group, an aryl group, and an alkoxy group;

and a recurring unit comprising at least one carboxylic acid group or salt thereof.

2. Method according to claim 1 wherein said recurring unit comprising at least one carboxylic acid group or salt thereof is a recurring unit corresponding to the following formula:

(III)

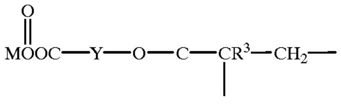

wherein:

$R^3$ represents hydrogen or a $C_1$ to $C_4$ alkyl group;

Y represents an organic linking group or a bond and;

M represents a hydrogen or a cation.

3. Method according to claim 1 wherein said amphiphilic copolymer further comprises siloxane containing recurring units.

4. Method according to claim 1 wherein $R_h$ represents an unsubstituted alkyl group and $R_f$ corresponds to $C_nF_{2n+1}$- wherein n is an integer between 3 and 14.

5. Method according to claim 2 wherein said amphiphilic copolymer comprises recurring units according to formula (I) in an amount of at least 1% by weight, said recurring units according to formula (I) in an amount of at least 20% by weight and said recurring units according to formula (III) in amount between 5% and 60% by weight, said weight percentages being relative to the total weight of recurring units according to formulas (I), (II) and (Ill).

6. Method according to claim 1 wherein said leather is also contacted with a water and/or oil repellent composition.

7. Method according to claim 1 wherein said amphiphilic copolymer is in the form of an aqueous dispersion.

8. Method according to claim 7 wherein said leather is contacted with said aqueous dispersion during retanning.

9. Method according to claim 2 wherein $R_h$ represents an unsubstituted alkyl group and $R_f$ corresponds to $(C_nF_{2n+1})$- wherein n is an integer between 3 and 14.

10. An amphiphilic copolymer comprising the following recurring units:

(I)

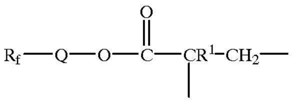

(II)

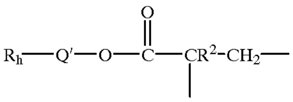

wherein:

$R_f$ represents a fluorinated alkyl group having at least 3 carbon atoms;

Q and Q' each independently represent an organic linking group or a bond;

$R^1$ and $R^2$ each independently represent hydrogen or a $C_1$ to $C_4$ alkyl group and;

$R_h$ represents a hydrocarbon group having at least 8 carbon atoms and optionally containing 1 to 3 substituents selected from the group consisting of a halogen, an amino group, an aryl group, and an alkoxy group;

and a recurring unit comprising at least one carboxylic acid group or salt thereof.

11. An amphiphilic copolymer according to claim 10 wherein said recurring unit comprising at least one carboxylic acid group or salt thereof is a recurring unit corresponding to the following formula:

(III)

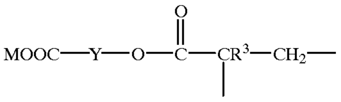

wherein:

$R^3$ represents hydrogen or a $C_1$ to $C_4$ alkyl group;

Y represents an organic linking group or a chemical linkage and;

M represents a hydrogen or a cation.

12. An amphiphilic copolymer according to claim 10 further comprising siloxane containing recurring units.

13. An amphiphilic copolymer according to claim 10 wherein $R_h$ represents an unsubstituted alkyl group and $R_f$ corresponds to $C_nF_{2n+1}$- wherein n is an integer between 3 and 14.

14. An amphiphilic copolymer according to claim 11 wherein said amphiphilic copolymer comprises recurring units according to formula (I) in an amount of at least 1% by weight, said recurring units according to formula (II) in an amount of at least 20% by weight and said recurring units according to formula (III) in amount between 5% and 60% by weight, said weight percentages being relative to the total weight of recurring units according to formulas (I), (11) and (III).

15. An aqueous composition comprising an amphiphilic copolymer according to claim 10.

16. An aqueous composition according to claim 15 further comprising a water and/or oil repellent composition.

17. An aqueous composition according to claim 16 wherein said water and/or oil repellent composition comprises fluoroaliphatic esters of dimer acids and/or trimer acids.

18. A leather treated with an amphiphilic copolymer according to claim 10.

19. An amphiphilic copolymer according to claim 11 wherein $R_h$ represents an unsubstituted alkyl group and $R_f$ corresponds to $(C_nF_{2n+1})$- wherein n is an integer between 3 and 14.

20. An aqueous composition comprising an amphiphilic copolymer according to claim 11.

21. An aqueous composition comprising an amphiphilic copolymer according to claim 12.

22. An aqueous composition comprising an amphiphilic copolymer according to claim 13.

23. An aqueous composition comprising an amphiphilic copolymer according to claim 14.

24. A leather treated with an amphiphilic copolymer according to claim 11.

25. A leather treated with an amphiphilic copolymer according to claim 12.

26. A leather treated with an amphiphilic copolymer according to claim 13.

27. A leather treated with an amphiphilic copolymer according to claim 14.

28. A method for making an amphiphilic copolymer comprising a free radical polymerisation of a mixture comprising monomers (a), (b) and an ethylenically unsaturated monomer having at least one carboxylic acid group or a salt thereof or a precursor of a carboxylic acid group:

(a)

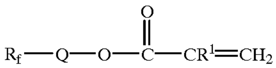

(b)

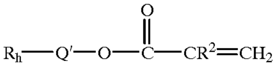

wherein:

at least 20% by weight of the total weight of recurring units is derived from monomer (b) and at least 1% by weight of the total weight of recurring units is derived from monomer (a);

$R_f$ represents a fluorinated alkyl group having at least 3 carbon atoms;

Q and Q' each independently represent an organic linking group or a chemical linkage;

$R^1$ and $R^2$ each independently represent hydrogen or a $C_1$ to $C_4$ alkyl group; and $R_h$ represents a hydrocarbon group having at least 8 carbon atoms and optionally containing 1 to 3 substituents.

29. A method according to claim 28 wherein said ethylenically unsaturated monomer corresponds to the following formula (c):

(c)

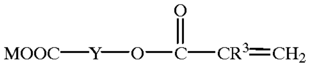

wherein:

Y represents an organic linking group or a chemical linkage;

$R^3$ represents hydrogen or a $C_1$ to $C_4$ alkyl group and;

M represents hydrogen or a cation.

* * * * *

UNITED STATES PATENT AND TRADEMARK OFFICE

CERTIFICATE OF CORRECTION

PATENT NO. : 6,294,103 B1
DATED : September 25, 2001
INVENTOR(S) : Coppens, Dirk M.

It is certified that error appears in the above-identified patent and that said Letters Patent is hereby corrected as shown below:

Column 1,
Line 34, "thereof After" should read -- thereof. After --;
Line 42, "waterproof" should read -- waterproof. --;
Line 64, "C12" should read -- $C_{12}$ --;

Column 3,
Line 20, "thereof It" should read -- thereof. It --;

Column 4,
Line 20, "(C)" should read -- (c) --;
Line 30, "azoisobutyronitrile" should read -- azo-isobutyronitrile --;

Column 5,
Line 22, "palrityl" should read -- palmityl --;
Line 40, "siloxane a: groups" should read -- siloxane groups --;
Line 61, "(In)," should read -- (III) --;
Line 61, "6%" should read -- 60% --;

Column 6,
Line 7, "thereof In" should read -- thereof. In --;
Line 57, "3.34" should read -- 3.3-4 --;

Column 8,
Line 43, "Nujol®" should read -- $Nujol^{R}$ --;

Column 9,
Line 58, "12%/a." should read -- 12%. --; and

UNITED STATES PATENT AND TRADEMARK OFFICE

CERTIFICATE OF CORRECTION

PATENT NO. : 6,294,103 B1
DATED : September 25, 2001
INVENTOR(S) : Coppens, Dirk M.

It is certified that error appears in the above-identified patent and that said Letters Patent is hereby corrected as shown below:

Column 12,
Line 19, "Properties or Wet" should read -- Properties of Wet --.

Signed and Sealed this

Third Day of September, 2002

*Attest:*

JAMES E. ROGAN
*Director of the United States Patent and Trademark Office*

*Attesting Officer*